(No Model.)
R. T. SCOWDEN, Dec'd.
J. P. SCOWDEN, Executrix.
APPARATUS FOR PURIFYING WATER.
No. 559,816. Patented May 12, 1896.
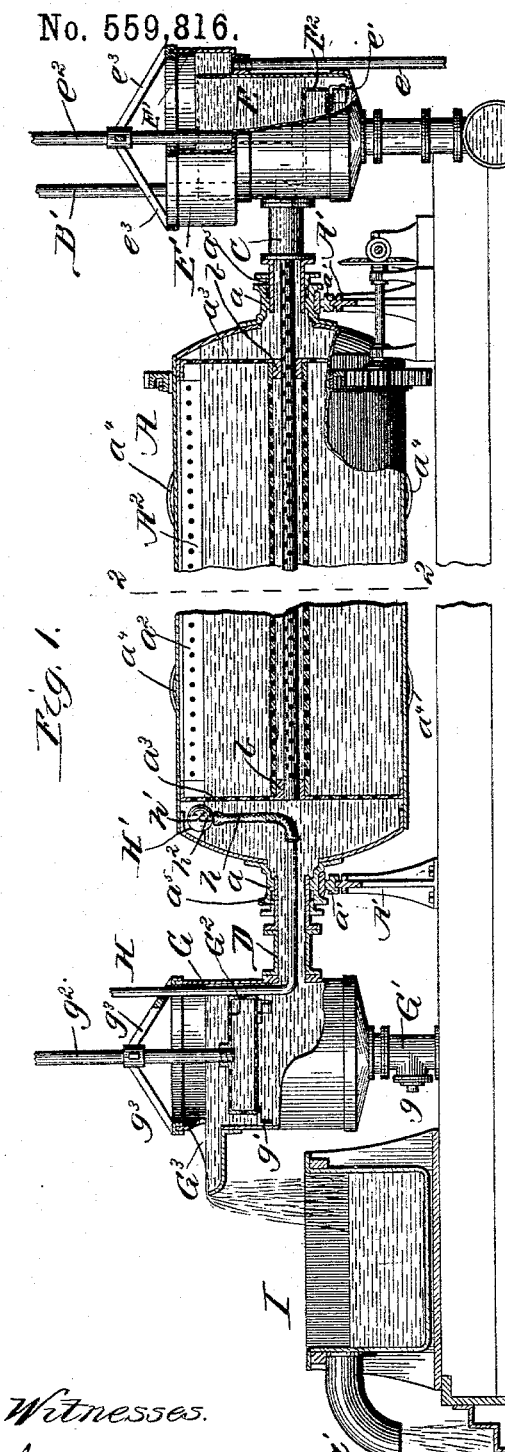
Witnesses.
Ivonie Miller.
Fred'k H. Mills.
Inventor:
Ransom T. Scowden
By Dayton, Poole & Brown
Attys.

UNITED STATES PATENT OFFICE.

RANSOM T. SCOWDEN, OF CHICAGO, ILLINOIS; JULIA P. SCOWDEN, EXECUTRIX OF SAID RANSOM T. SCOWDEN, DECEASED, ASSIGNOR, BY MESNE ASSIGNMENTS, TO THE REVOLVING PURIFIER COMPANY, OF NEW JERSEY.

APPARATUS FOR PURIFYING WATER.

SPECIFICATION forming part of Letters Patent No. 559,816, dated May 12, 1896.

Application filed November 10, 1891. Renewed October 16, 1895. Serial No. 565,889. (No model.)

*To all whom it may concern:*

Be it known that I, RANSOM T. SCOWDEN, of Chicago, in the county of Cook and State of Illinois, have invented certain new and useful Improvements in Apparatus for Purifying Water; and I do hereby declare that the following is a full, clear, and exact description thereof, reference being had to the accompanying drawings, and to the letters of reference marked thereon, which form a part of this specification.

This invention relates to apparatus for purifying water, and more particularly to that class of apparatus in which iron in the shape of "scrap"—such as borings, turnings, or the like—is used as the main purifying agent, the system being known as the "Anderson" system.

The chief object of my present invention is to increase the purifying action of the apparatus, to which end my invention chiefly relates to certain novel features of the apparatus whereby the solution of the iron employed as the purifying agent is facilitated, while a more thorough aeration of the water increases the oxidation, provision being made for the settling of the precipitate thus formed.

The invention further has for its object the improvement of various details of the mechanical structure of the apparatus whereby improved results are obtained.

To these and other ends the invention consists in certain novel features which I will now proceed to describe, and will then particularly point out in the appended claims.

In the accompanying drawings, Figure 1 is a central longitudinal vertical sectional view of an apparatus embodying my invention in one form. Fig. 2 is a transverse sectional view of the cylinder, taken on the line 2 2 of Fig. 1. Fig. 3 is a detail plan view of that portion of the apparatus at the left of Fig. 1. Fig. 4 is a similar view of that portion at the extreme right of Fig. 1. Fig. 5 is an enlarged view of the central portion of Fig. 2. Fig. 6 is a detail sectional view of the float.

In the said drawings, A represents a hollow cylinder provided at its ends with hollow trunnions $a$, by means of which it is supported in suitable bearings $a'$, on standards or uprights A'. This cylinder is divided into a plurality of longitudinal chambers or compartments $A^2$ by means of a plurality of radial longitudinal partitions $a^2$, which extend from the inner wall of the cylinder A toward its axis. At this point there is located a sleeve B, to which the inner edges of the radial partitions $a^2$ are secured in any suitable manner, their outer ends being secured to the cylinder A. Near each end of the cylinder there is located a transverse partition $a^3$, secured at its margin to the cylinder, and the ends of the sleeve B abut against the said transverse partitions $a^3$ and are secured thereto. The partitions $a^2$ and $a^3$ and the sleeve B are apertured, being perforated or slotted or otherwise so constructed as to allow free passage of water and air through them. The chambers or compartments $A^2$ are each partly filled with scrap-iron in the shape of iron borings, turnings, or punchings, or in other suitable and convenient form, and suitable hand-holes $a^4$, having closures of any approved form, are provided in the cylinder A to give access to the interior of the several compartments $A^2$, for the purpose of removing and replacing the scrap-iron therein. The cylinder A is caused to revolve in its bearings either by gearing from any suitable source of power, as shown in Fig. 1, or by any other suitable means.

C is an inlet-pipe by means of which water is introduced into the cylinder, the said pipe extending into one of the hollow trunnions $a$, which is provided with a suitable stuffing-box $a^5$, to prevent leakage at this point.

D is the outlet-pipe, which extends into the other trunnion $a$, which is similarly provided with a stuffing-box $a^5$.

E is an aerating-tank intermediate between the supply-pipe F and inlet-pipe C. In the present instance I have shown the supply-pipe as opening into the bottom of the tank E, while the inlet-pipe C leads from the side of said tank horizontally into the trunnion $a$. The upper end of the tank E is open, the upper margin of said tank being at a height somewhat below the level of the uppermost portion of the interior of the cylinder A and preferably at a distance below the same equal to about one-tenth of the diameter of this latter—say about six inches, in case the diameter of the cylinder is five feet. This distance may, however, be varied, as desired, within reasonable limits. The upper end of the tank proper, E, is surrounded by an overflow-basin E', extending below the upper margin of the same and open at its upper end. A waste-pipe $e$ leads from the bottom of the overflow-basin E' to any suitable point of discharge.

$E^2$ is an apertured air-box arranged within the tank E, near the bottom thereof, being desirably supported by lugs $e'$, or in any other suitable manner. An air-pipe $e^2$, connected with any suitable source of air under pressure, supplies air to the air-box, extending vertically downward through the tank E and opening into the top of the box $E^2$. This pipe is supported at a point above the tank E by means of arms $e^3$, extending to and resting on the margin of the overflow-basin E'.

B' is an air-supply pipe connected with any suitable source of air under pressure, desirably the same as that which supplies the pipe $e^2$, the said pipe B' extending vertically downward into the tank E to a point opposite the mouth of the inlet-pipe C, through which it extends horizontally inward into the cylinder A, passing centrally through the inlet-pipe C, trunnion $a$, and sleeve B. Suitable bearings $b$ are provided at the points where the pipe B' passes through the one transverse partition $a^3$, and also where it abuts against the other transverse partition $a^3$, at which latter point the said pipe terminates. That portion of the pipe B' within the sleeve B is apertured to permit the escape of the air, and that portion within the inlet-pipe C may be similarly perforated, if desired, as indicated in Fig. 1.

G indicates an aerating-tank located adjacent to the outlet end of the cylinder A, the outlet-pipe D of which opens directly into the side of said tank. The tank G is open at its upper end and is provided at its lower end with and supported on a waste or discharge pipe G', having a hand-hole $g$ with a suitable closure, by means of which the waste water may be discharged and the sediment deposited in the tank G removed.

$G^2$ is an apertured air-box located within the tank G above the mouth of the outlet-pipe D of the cylinder A, being supported by means of lugs $g'$, or in any other suitable manner, and being supplied with air under pressure from any suitable source by means of a pipe $g^2$. Arms $g^3$, resting on the upper edge of the tank G, serve to support the pipe $g^2$. The said tank is provided at the proper height, which is that of the water-line of the apparatus, with a discharge-spout $G^3$.

H is an air-discharge pipe extending downward in the tank G to the outlet-pipe D, through which it extends into the cylinder A, being provided within said cylinder with a flexible continuation $h$, of rubber tubing or the like, terminating in a float H', which supports the upper end of the flexible tube $h$. I prefer to make this float in the form of a hollow ball or sphere $h'$ of sheet metal, having a tube $h^2$ passing diametrically through it, to the projecting lower end of which the upper end of the flexible tubing is suitably coupled or connected. It will be noted that one of the transverse partitions $a^3$, which is nearest the outlet end of the cylinder A, is placed at such a distance from said outlet as to form a space or chamber in which the float H' will have ample room to float upon the water when the apparatus is in operation, with the mouth of the tube $h^2$ above the water-line.

I is a settling-trough into which the water falls as it is discharged from the spout $G^3$ of the tank G. The said trough is of considerable length, and is provided at its remotest point from the spout $G^3$ with a discharge-spout $i$, through which the water is discharged into a subsiding or filtering basin J. At this point of discharge there is provided a cataract K, composed of a series of steps or benches, suitably supported by braces $k$ or other means.

In purifying apparatus of this type, using a revolving cylinder containing scrap-iron, the general operation is as follows: The water to be purified as it passes through the cylinder becomes charged with ferrous carbonate, this effect being due to the action upon the iron particles of the carbonic acid gas and oxygen contained in the water and air, this action being assisted by the attrition of the iron particles upon each other and upon the walls and partitions of the cylinder, which are also of iron, and the ferrous carbonate thus formed is by aeration and consequent oxidation converted into insoluble ferric hydroxid, which unites with and carries down the organic matter and other impurities of the water and subsequently oxidizes and destroys them. This oxidation takes place partly in the cylinder, but mostly after the water has left the cylinder. I have found that in apparatus of this class using a closed cylinder it is difficult to obtain the necessary aeration in the apparatus as heretofore constructed, by reason of the impossibility of forcing a sufficient supply of air into the cylinder, owing to the necessary smallness of the supply-pipe found practicable and to the difficulties in the way of providing an adequate escape for the air from the top of the cylinder, which vitiated air there accumulating not only retards the desired chemical changes, but also creates a back pressure, which resists the further introduction of the necessary fresh supply. These latter difficulties arise chiefly from the fact that the "bell-mouth" heretofore employed to collect the water at the outlet-pipe frequently becomes displaced, and in its turn displaces the air-outlet pipe, which latter, when totally submerged, is useless.

Referring now to the operation of my improved apparatus, it will be seen that the water as it enters the apparatus receives a thorough aeration in the tank E before passing into the cylinder, while in the cylinder, and while passing from the tank E to the cylinder air is further supplied by means of the apertured pipe B'. The introduction of the air into the cylinder is greatly facilitated by the provision made to insure the escape of the air from the top of the cylinder. The bell-mouth is dispensed with, the transverse partitions $a^3$ rendering its use superfluous, and the danger of displacement of the air-outlet pipe is thus done away with, a separate chamber being formed in the end of the cylinder between the partition $a^3$ and the cylinder-head, in which the air-outlet pipe is safe from disarrangement. Moreover, any danger of the submergence of the mouth of the inlet-pipe by variations in the height of the water-level is done away with in an obvious manner by the use of the float and flexible connection. A sufficient supply of air to the water in the cylinder is thus assured. Upon leaving the cylinder the water is again thoroughly aerated in the tank G before passing to the settling-trough. In this trough a great portion of the impurities are precipitated and the water is thoroughly exposed to the air. A final aeration is given to the water by the cataract K on its passage from the settling-trough to the basin J. In this latter the purification of the water is completed by sedimentation or filtration, or both.

I find that the arrangement of radial longitudinal plates shown and described gives superior results, owing to the increase of frictional contact surface thus obtained for the scrap-iron, which is always in contact with a metallic surface, thus increasing the attrition and consequently the solution of the iron. Moreover, the iron is positively and repeatedly carried through the water and comes equally and thoroughly into contact with all portions of it.

What I claim is—

1. In an apparatus for purifying water, by contact with scrap-iron, a closed cylinder having a plurality of longitudinal radial apertured partitions, and transverse apertured partitions one near each end of the cylinder, whereby longitudinal chambers to receive the scrap-iron and wholly inclose the same are formed, substantially as described.

2. In an apparatus for purifying water by contact with scrap-iron, a closed cylinder having transverse apertured partitions located one near each end of the cylinder, an apertured sleeve centrally connecting said partitions and forming a space to receive an air-supply pipe, and radial longitudinal apertured plates extending from said sleeve to the cylinder, substantially as described.

3. In an apparatus for purifying water by contact with scrap-iron, the combination, with a cylinder having longitudinal compartments to receive the scrap-iron, and a transverse apertured partition some distance inward from the outlet end of the cylinder and forming a chamber at said outlet end, into which the water-outlet opens, of an air-outlet pipe located in said chamber, and means for introducing air into the cylinder, substantially as described.

4. In an apparatus for purifying water by contact with scrap-iron, the combination, with a cylinder having a chamber at its outlet end, and a hollow trunnion forming the water-outlet, of a fixed pipe extending through said trunnion and provided within the cylinder with a flexible extension having a float to support its end above the water-level, substantially as described.

5. In an apparatus for purifying water by contact with scrap-iron, the combination, with a revolving cylinder having a chamber at its outlet end and a hollow trunnion forming the water-outlet, of an air-outlet pipe extending from within the cylinder through the trunnion to the outer air, and having both of its ends above the water-level of the apparatus, substantially as described.

In testimony that I claim the foregoing as my invention I affix my signature in presence of two witnesses.

RANSOM T. SCOWDEN.

Witnesses:
IRVINE MILLER,
C. A. NEALE.